United States Patent [19]

Bryngdahl et al.

[11] 4,106,844
[45] Aug. 15, 1978

[54] LASER SCANNING SYSTEM UTILIZING COMPUTER GENERATED HOLOGRAMS

[75] Inventors: Olof Bryngdahl; Wai-Hon Lee, both of Cupertino, Calif.

[73] Assignee: Xerox Corporation, Stamford, Conn.

[21] Appl. No.: 772,603

[22] Filed: Feb. 28, 1977

Related U.S. Application Data

[63] Continuation of Ser. No. 590,190, Jun. 25, 1975, abandoned.

[51] Int. Cl.² ............................................. G02B 27/17
[52] U.S. Cl. ................................... 350/6.2; 350/3.71; 350/162 R; 358/85
[58] Field of Search ............... 350/6, 7, 3.5, 162 R, 350/162 SF, 162 ZP, 272; 358/85

[56] References Cited

U.S. PATENT DOCUMENTS

| | | | |
|---|---|---|---|
| 3,267,284 | 8/1966 | Mackta | 350/162 R |
| 3,550,085 | 12/1970 | Silverman | 350/162 SF |
| 3,614,193 | 10/1971 | Beiser | 350/7 |
| 3,619,033 | 11/1971 | McMahon | 350/162 R |
| 3,703,724 | 11/1972 | Thomas | 350/7 |
| 3,721,487 | 3/1973 | Pieuchard et al. | 350/3.5 |
| 3,721,498 | 3/1973 | Narodny et al. | 350/3.5 |

*Primary Examiner*—John K. Corbin
*Assistant Examiner*—B. W. delos Reyes
*Attorney, Agent, or Firm*—Sheldon F. Raizes; Irving Keschner

[57] ABSTRACT

A laser scanning system wherein the scanning line is produced by interposing a computer generated hologram and lens between an illuminating laser beam and the plane of the scan line. Three types of scan patterns (one, two and three dimensional), continuous as well as discontinuous, can be realized by utilizing the principles of the invention.

4 Claims, 17 Drawing Figures

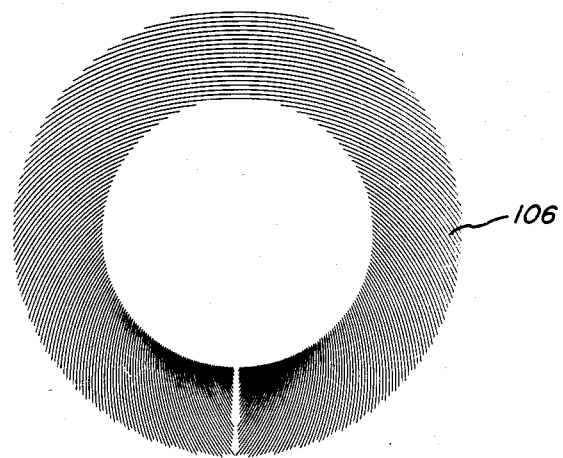
FIG. 12B
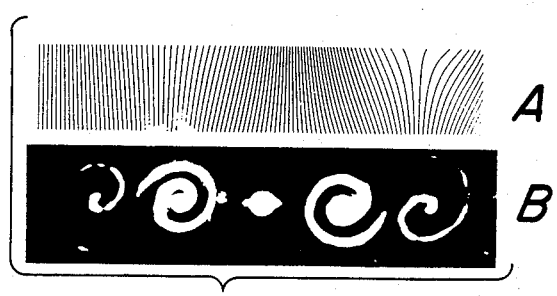
FIG. 13
FIG. 14
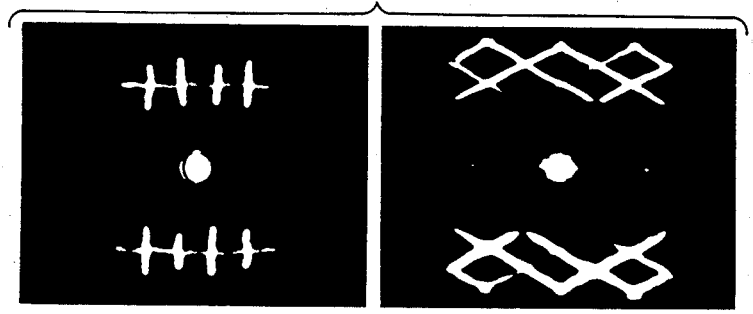

LASER SCANNING SYSTEM UTILIZING COMPUTER GENERATED HOLOGRAMS

This is a continuation of application Ser. No. 590,190, filed June 25, 1975, now abandoned.

BACKGROUND OF THE INVENTION

Prior art laser scanner systems frequently use mechanical scanners, such as polygon prisms, to scan an object. The production costs associated with polygon prisms are relatively high because of the angular precision needed in the reflecting surfaces. Alternative scanning techniques have therefor been sought in the prior art.

The utilization of rotating holographic gratings for image scanning was first disclosed by Cindrich in an article published in *Applied Optics*, Volume 6, page 1531 (1967). Subsequent thereto, McMahon et al (*Applied Optics*, Volume 8, page 399 (1969)) disclosed a two-dimensional raster scanning system using a set of rotating holograms. By using holograms, the mechanical system in their scanner was significally simplified. Also, since there was no restriction on the shape of the surface for recording holograms, the geometry of the scanning surface could be selected to achieve a high-speed and mechanically stable system. In general, the mechanical design of the scanner can be separated from its optical design with holographic techniques. Other advantages of holographic scanners include:

(1) accuracy (reliance only on positional accuracy) and economy in fabricating holographic gratings,
(2) two or three-dimensional raster scanning, and
(3) multi-wavelength raster scanning for color displays.

Prior art holographic scanners are shown, for example, in U.S. Pat. Nos. 3,614,193, 3,721,486 and 3,721,487.

The gratings in the prior art scanners have basically one spatial frequency. Scanning is done by changing the angular orientation of the grating. However, a light beam can also be deflected by varying the spatial frequency of the gratings in a manner similar to acoustic beam deflectors which provides a less complex system of scanning. Although the scanner disclosed in U.S. Pat. No. 3,721,486 achieves a variable spatial frequency grating by combining two gratings of a single spatial frequency, the requirement of an additional grating is an obvious limitation to its utilization. A space variant frequency grating can be constructed so that the varying deflection of the light beam is produced by moving different parts of the grating across the light beam as set forth by Wollenmann et al in the *Journal of the Optical Society of America*, Volume 64, page 562 (1974). The space-variant frequency grating can be replaced by a glass wedge of variable slopes as described in U.S. Pat. Nos. 2,976,362 and 3,818,132, although the flexibility of the holographic grating has distinct advantages in laser scanning system. A prior art space-variant frequency grating which may be utilized for laser beam scanning is a Fresnel zone plate, the spatial frequency thereof varying linearly with its radius. In this system (Wollenmann et al), the grating is recorded by the interferometric techniques on a transparent drum coated with photoresist.

SUMMARY OF THE PRESENT INVENTION

The present invention provides a laser scanning system using computer generated generalized optical diffractive elements, such as holograms, as space-variant frequency gratings. Because the transmittance of computer generated holograms can be made binary, they are relatively easy to make and duplicate. The computer generated holograms can be recorded on planar material and then placed on a drum for scanning, or recorded on a disk. Although the diffraction effeciency of bleached computer generated holograms is high (maximum 43%), the wavefront can be copied onto a thick recording material by interferometric techniques in order to achieve an even higher deffraction efficiency. In general, because computer generated holograms are made under the control of a digital computer, they are more flexible than other types of holograms. For example, the spatial frequency variation of a computer generated hologram can be controlled to produce linear and non-linear scan rates and provide space-variant focusing properties.

It is an object of the present invention to provide an improved laser scanning system which utilizes computer generated generalized optical diffractive elements, such as holograms, to produce a laser scan line.

It is a further object of the present invention to provide an improved laser scanning system wherein the scanning line is produced by interposing a computer generated hologram and lens between an illuminating laser beam and the plane of the scan line.

It is still a further object of the present invention to provide an improved laser scanning system which utilizes a computer generated hologram having space-variant frequency gratings thereon to produce a laser scan line.

It is a further object of the present invention to provide an improved scanning system wherein three types of scan patterns (one, two and three dimensional), continuous and discontinuous, may be realized.

DESCRIPTION OF THE DRAWING

For a better understanding of the invention, as well as other objects and further features thereof, reference is made to the following description which is to be read in conjunction with the accompanying drawing wherein:

FIG. 13(a) illustrates a computer generated hologram and FIG. 13(b) shows the corresponding scan pattern therefore.

DESCRIPTION OF THE PREFERRED EMBODIMENT

Figure 1:
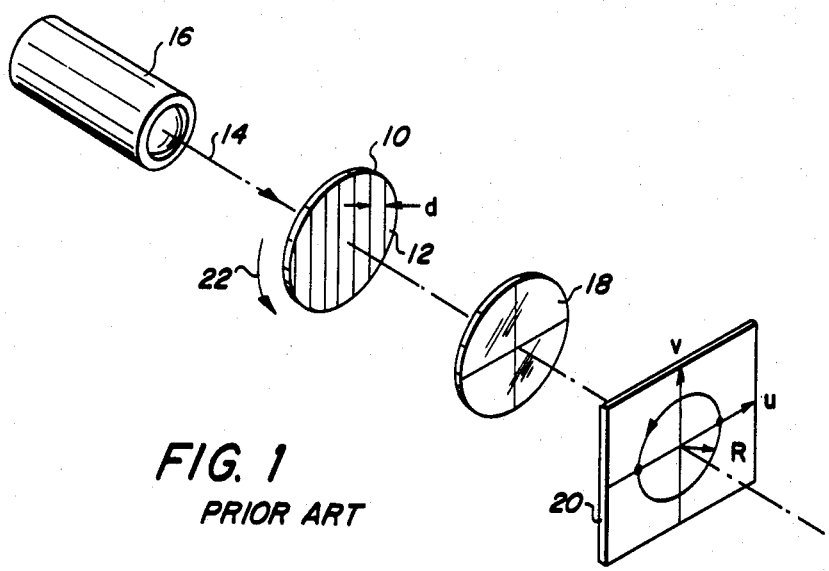
FIG. 1 illustrates a prior art holographic scanner.

In order to particularly point out the advantages of the present invention, a brief description of the prior art holographic scanners follows. In particular, a rotating grating scanner 10 having gratings 12 of period $d$ is shown in FIG. 1. The grating 10 is illuminated by a collimated laser beam 14 generated by laser 16. When the lines of the grating are parallel to the vertical ($v$) axis, the ± 1st-order diffracted waves from grating 12 will be focused on the horizontal ($u$) axis at $u = \pm \lambda F/d$ at the back focal plane 20 of focusing lens 18, F being the focal length thereof. As the grating 10 rotates in the direction of arrow 22, the two focused spots will move according to $$u = \pm R \cos\phi$$
$$v = \pm R \sin\phi \tag{1}$$

where $R = \lambda F/d$ and $\phi$ is the angle of rotation of scanner 10 relative to vertical axis $v$ (zero in the figure) and $\phi$ is the wavelength of laser beam 14. The locus of the focused scanned spots form a circle with radius R in the frequency plane 20, the scan lines being along an arc of a circle.

The circular scan can be converted into a linear scan by techniques such as that described in the aforementioned U.S. Pat. No. 3,721,486. A second grating can be put in tandem with the first grating and made to rotate 90° out of phase from the first grating. With the two gratings in series there will be four spots in the frequency plane 20. If the periods of the two gratings are the same the locus of the four spots forms two straight lines described by $$u = \pm v. \tag{2}$$

The number of spots that can be addressed by the rotating grating scanner is determined as follows. If the diameter of the laser beam 14 is D, the size of the diffraction-limited spot in the frequency plane 20 is $\lambda F/D$. For a scan line that covers an angle $\theta$ in the frequency plane, the number of resolvable spots N along the scan is $$N = R\theta D/\lambda F$$
$$= \theta(D/d). \tag{3}$$

The ratio D/d is the number of grating periods illuminated by the laser beam. To illustrate, if D = 25 mm, $\theta$ = 60° and d = 1$\mu$m, N≈25,000.

Since the present invention is concerned with the use of a binary grating having a space-variant frequency, and in particular, a computer-generated generalized optical diffractive element, such as a hologram (CGH), having this characteristic, in a laser scanner, a mathematical description of the binary grating is set forth hereinafter.

As is well known, optical elements introduce a certain phase variation over the wavefront traveling through the system incorporating the elements. The implementation of this variation with diffractive elements by the configuration of spatial patterns can be utilized in fabricating an optical scanner.

It is possible to incorporate several important and useful features in the computer generation of these elements. For example, the geometrical shape of the elements can be arbitrarily chosen such that either a translational or rotational movement can be produced, the amount and direction of the phase gradient can be spatially varied in an arbitrary way such that any configuration of scanning pattern can be created, and the curvature of the phase variation can be spatially influenced whereby the scanning pattern can be formed on the surfaces of different shapes. Both focusing and deflecting properties can be included in the computer generated hologram.

Figure 2:
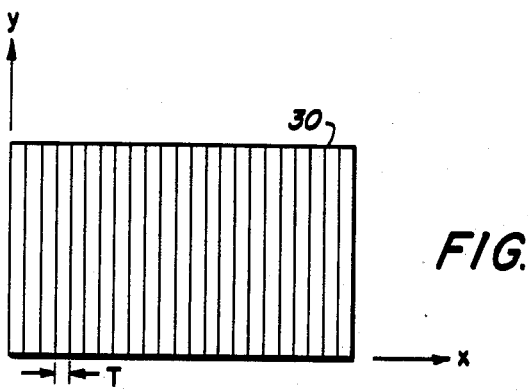
FIG. 2 is the structure of a regular binary grating.
Figure 3:
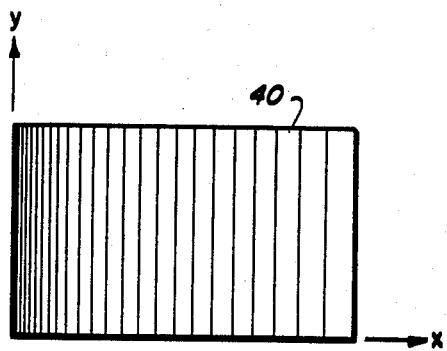
FIG. 3 illustrates a computer generated hologram having a space-variant spatial frequency.

The structure of a regular binary grating 30 shown in FIG. 2 can be described by the equation:

$$q/2 < x/T + n < q/2, \tag{4}$$

where T is the grating period, $n$ is an integer and $q$ is a parameter used to control the line width in the grating. The transmittance of the grating at $(x,y)$ will be 1 or 0 depending on whether it satisfies equation 4. The structure of the CGH with a space-variant spatial frequency is shown in FIG. 3 and can also be described by a similar grating equation:

$$-q/2 < \theta(x,y)|2\pi + n < q/2 \tag{5}$$

If a CGH is made according to Eq. 5, the spatial frequency $\nu(x,y)$ of the CGH 40 along $x$ will be $$\nu_x(x,y) = 1/2\pi \, \delta\phi(x,y)/\delta x \tag{6}$$

Figure 4:
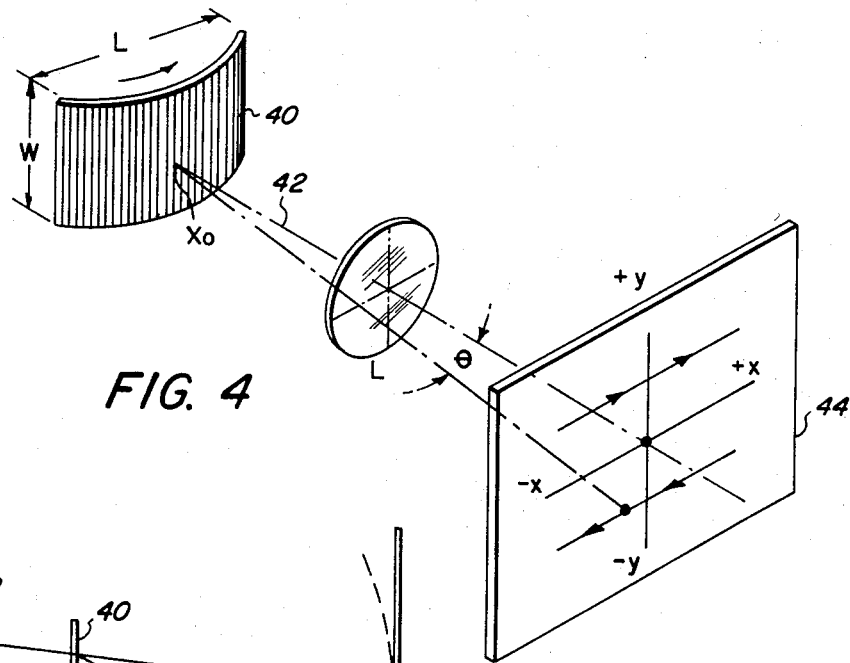
FIG. 4 is a block diagram illustrating one embodiment of the present invention.

Referring to FIG. 4, when CGH 40 is moved across laser light beam 42, the deflection angle $\theta$ of the light beam 42 is changed by $\nu_x(x,y)$ according to the following equation:

$$\sin\theta = \lambda\nu_x(x,y) \tag{7}$$

In a laser scanner it is important for the scanning rate to be linear. Therefore, $\nu_x(x,y)$ is required to be a linear function of $x$. For this particular spatial frequency variation, the following differential equation is obtained from Eq. 6:

$$\delta\phi(x,y)/\delta x = 2\pi x/w \Delta x. \tag{8}$$

The parameters $w$ and $\Delta x$ will be described in detail hereinafter. The following results from equation 8:

$$\phi(x,y) = \pi x^2/w\Delta x + g(y) \tag{9}$$

where $g(y)$ is the constant of integration representing the portion of the phase of the CGH dependent on $y$ and is determined by other considerations. In order to provide an off-axis CGH, it is assumed that $$g(y) = \pi y^2/w\Delta x + 2\pi y/T. \tag{10}$$

With this $g(y)$, the phase of CGH 40 is equal to
$$\phi(x,y) = \pi(x^2 + y^2)/w\Delta x + 2\pi y/T. \tag{11}$$

CGH 40 produces a wavefront which is similar to that produced by an off-axis spherical zone plate. A method for making CGH's is discussed in the article by Wai-Hon Lee, *Applied Optics*, volume 13, page 1677, July, 1974 and the teachings thereof is incorporated herein by reference. By selecting the proper form of g(y), CGH 40 can be equivalent to an interferogram formed by interfering a spherical wave with a tilted plane wave. If the scan direction is along $x$, the tilted plane wave produces a carrier frequency (the frequency on which the phase information is stored) in a direction normal to the scan direction. The carrier of a CGH will inhibit the scan line from passing through the undiffracted portions of the light (0th order light). The position of the fringes in the CGH can be determined by substituting Eq. 11 and Eq. 5 and solving for $y$. It can be shown that $$y = w\Delta x/T \pm [(x\Delta x/T)^2 - (2n \pm q)w\Delta x - x^2]^{\frac{1}{2}} \quad (12)$$

Thus, the CGH consists of a set of parabolas. The spacing of the parabolas is not uniform; they become closer with increasing value of $n$. Since the fringes in the CGH can be determined analytically, the remaining problem is to relate the parameters T, $w$ and $\Delta x$ to the parameters of the scanners.

For example, assume that CGH 40 is illuminated by a collimated laser beam at $x = x_o$. the phase of the diffracted wavefront from CGH 40 is $$\phi(x,y) = \pi [(x - x_o)^2 + y^2]/w\Delta x + 2\pi y/T$$

$$= \pi (x^2 + y^2)/w\Delta x + 2\pi y/T - 2\pi xx_o/w\Delta x + \pi x_o^2/w\Delta x \quad (13)$$

The first term in the wavefront represents a spherical wave having focal length $w\Delta x/\lambda$. The second term represents a tilt in the diffracted wavefront. The third term, which is linear in both $x$ and $x_o$, is responsible for deflection of the laser beam. The deflection angle as a function of $x_o$ is given by $$\sin\theta = \lambda x_o/w\Delta x. \quad (14)$$

If $w$ is the diameter of the laser beam, the angular resolution of the diffracted beam is $\Delta\theta = \lambda/w$. From Eq. 14, if CGH 40 is moved from $x_o$ to $x_o + \Delta x$, the angle of the diffracted beam will be changed by $\Delta\theta$ (i.e. $\Delta x$ is the amount CGH 40 must be moved in the $x$ direction to cause a deflection angle change of $\Delta\theta$). Therefore, $\Delta x$ in $\phi(x,y)$ is the distance that CGH 40 must move to address the next resolvable positions. For a CGH with length L, the number of resolvable positions N can be determined by $$N = L/\Delta x. \quad (15)$$

Because the spatial frequency on CGH 40 along $x$ is linearly dependent on $x$, the maximum spatial frequency $\nu_o$ along $x$ occurs at $x = \pm L/2$ and is equal to $\nu_o = L/2 w\Delta x$. In constructing the CGH it is convenient to set $\nu_o$ to multiples of the carrier frequency $1/T$. This results in the following relationship:

$$L/2w \Delta x = Q/T, \quad (16)$$

Q being a constant. Using Eq. 15 in Eq. 16 we obtain $$N = 2Qw/T$$

$$= 2QN_f \quad (17)$$

wherein $N_f = w/T$. $N_f$ as defined is equal to the number of grating periods along the y-axis illuminated by the laser beam. Eq. 17 is similar to Eq. 3 in that N is proportional to the number of grating periods covered by the light beam. Observe that N is independent of the length L or the width $w$ of the grating. In this particular CGH the parameters $w$ and L are also related. In examining the spatial frequency of the CGH, it is noted that $$\nu_y = 1/T + y/w\Delta x \text{ for } 0 < y < w. \quad (18)$$

Because the CGH is binary, higher harmonics of $\nu_y$ will occur. To avoid overlapping of the spatial frequencies from the first and higher harmonics, the maximum value of $\nu_y$ must be less than or equal to $2/T$. Therefore, from Eq. 18 we obtain $$1/\Delta x < 1/T. \quad (19)$$

Substituting Eq. 19 into Eq. 16 yields $$L/w > 2Q$$

or $$L > 2Qw. \quad (20)$$

This equation gives us the aspect ratio (ratio between length and width) of the hologram. In addition to Eq. 20, the width $w$ of the CGH is often determined by the spot size required in the scanning. Equations 15-20 are constructional equations for the CGH used in the scanner of the present invention and are shown in FIGS. 6, 8, 9 and 10. The scan lines on the frequency plane 44 is produced by moving different parts of CGH 40 across laser beam 42.

Figure 5:
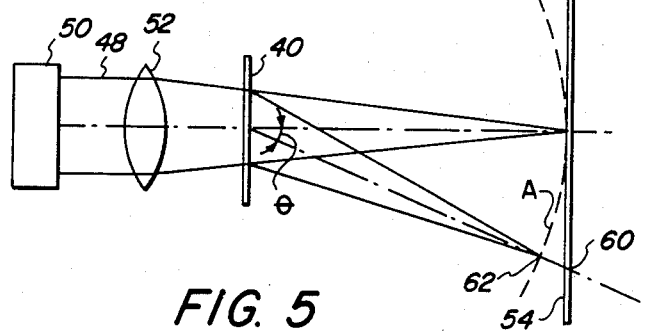
FIG. 5 is a second embodiment of the present invention.

For practical reasons CGH 40 is often illuminated by converging beam 48 as shown in FIG. 5. In particular, beam 48, produced by laser 50, is converged by lens 52 onto CGH 40 as shown. This arrangement has the advantage that the f-number of lens 52 is determined only by the spot size. However, with converging beam 48 the focus of the scanned spots now falls on curved surface A. In order to produce a flat scan at frequency plane 54, CGH 40 is placed at the front focal plane of a lens as in FIG. 4 and illuminating CGH 40 bby a point source at a distance of $w\Delta x/\lambda$ from the CGH (a point source is formed in the focal plane of a lens placed in a laser beam). In using this method, the f-number required of lens 52 is determined by the scanned angle $\theta$ as well as the spot size. This often results in having a lens with small f-number in the scanning system. It should be noted that frequency plane 54 may correspond to the surface of a document being scanned or the surface of a photoreceptor in accordance with standard laser scanning systems.

It is also possible to use the CGH 40 to correct for the field curvature. To focus at point 60 rather than point 62 in FIG. 5, the wavefront recorded in the CGH 40 must contain a component which can change the focal power of the CHG as a function of the deflection angle. Since the converging beam comes to a focus at a distance equal to the rear focal length of lens 52, from geometric considerations the focal length of the correction term in CGH 40 must equal $-1-\cos\theta$). The wavefront recorded in the CGH now becomes $$\phi(x,y) = \pi r^2/2 \Delta x + \pi r^2 (1-\cos\theta)/F + 2\pi y/T \quad (21)$$

where $r^2 = x^2 + y^2$. The second term in Eq. 21 is like a thin lens with variable focal length. The deflection angle $\theta$ is related to the parameters $w$ and $\Delta x$ through the spatial frequency of CGH 40 as follows:

$$\sin\theta = \lambda\nu.$$

and $$v = x/w \Delta x. \quad (22)$$

Therefore, $\phi(x,y)$ can be written $\phi(x,y) = \pi r^2/w \Delta x + \pi r^2(1 - \sqrt{1-\lambda^2 x^2/w^2\Delta x^2})/\lambda F. \quad (23)$ The addition of the correction term in $\phi(x,y)$ generally increases the bandwidth requirement of the CGH. This can be seen by analyzing the spatial frequencies produced by the function $\phi(x,y)$ in Eq. 23. For $\theta$ less than 20°

$$\phi(x,y) \approx \pi r^2/w\Delta x + \pi\lambda r^2 x^2/2w^2\Delta x^2 F. \quad (24)$$

The bandwidth of $\phi(x,y)$ is given by the spatial frequency of $\phi(x,y)$ at $x = L/2$. For $y = 0$ the spatial frequency variation due to $\phi(x,y)$ is equal to $$v_x(x) = x/w\Delta x + \lambda x^3/w^3\Delta x^2 F$$

$$= Q/T [x' + \lambda(Q/T)(Q/f\text{-number}) x'^3]$$

$$= Q/T [x' + \sin\theta_o(Q/f\text{-number})x'^3] \quad (25)$$

where $x' = 2x/L$ and $f$-number $= F/w$. In obtaining Eq. 25, the results in Eq. 14, Eq. 18, and Eq. 19 have been utilized. The angle $\theta_o$ is the maximum deflection angle produced by the CGH. For $\theta_o = 10°$, $\lambda = 6328$ nm, $f$-number $= 10$ and $Q = 5$, Eq. 25 indicates that the bandwidth required to record the CGH is increased by 9% (from 274 1/mm to 299 1/mm). Therefore, the inclusion of the correction term in CGH 40 does not increase significantly the bandwidth required in making the CGH.

The advantage of having the correction term in the CGH can be seen by the following comparison. Suppose that the scanned beam subtends an angle of 5° with respect to the optical axis. Without the correction term in the CGH the laser beam is focused at a distance of 0.0038F from the flat surface. From geometric consideration the spot size on the flat surface is about 0.0038w, where w is the diameter of the illumination beam. For $w=20$mm the spot size is 76μm. On the other hand with the correction term in the CGH the laser beam will be focused on the flat surface. At that scanned angle the effective forcal length of the lens has been lengthened to 1.0038F. This results in only 0.38% change in the spot size. For an f/10 system this means that the spot size has changed from 12.66μm to 12.70μm. Therefore, the correction term indeed significantly improves the perfromance of the scanner. However, as evidenced in Eq. 25, the correction term may introduce non-linearity in the scan. The spacing between the scanned spots is proportional to $\delta v_x/\delta x'$, i.e.

$$d(x) = 1 + 3\sin\theta_o(Q/f\text{-number})x'^2. \quad (26)$$

The amount of non-linearity is dependent on the parameters in Eq. 26 and it increases as $x'^2$. For $\theta_o = 10°$, $Q = 5$ and $f$-number $= 10$, the maximum change in the spacing between the scanned spots is about 26%. The larger the scanned angle $\theta_o$ the more severe is the non-linearity. This type of non-linearity can be reduced by properly selecting lens 52 such that the phase function corrects the field curvature while maintaining linearity in the scan.

the scanning of a laser light beam by a space-variant grating such as that formed on a CGH will now be illustrated. In Eq. 10 $g(y)$ was selected so that the CGH is similar to an off-axis spherical zone plate. In the following demonstration, the function $g(y)$ will be simply chosen to be $2\pi y/T$. This results in a CGH similar to an off-axis cylindrical zone plate. By selecting this particular form for $g(y)$ the fringes in the CGH become equally spaced parabolas defined by $$y = nT - x^2T/2w\Delta x. \quad (27)$$

Because there is only a constant spatial frequency along the y direction, the restriction on w and L in Eq. 20 is no longer applicable. Hence, the values of w and L can be selected independently. Since there is no focal power in the y direction in the CGH, the optical system in the scanner may be basically astigmatic. If the CGH is illuminated by a collimated laser beam as shown in FIG. 4, the laser beam in the y direction will be focused on the back focal plane of the lens. But the light beam in the x direction will focus at $\pm\lambda F^2/w \Delta x$ from the back focal plane. Without correction, a line rather than a focused spot will be scanned in the frequency plane. The astigmatism in the optical system can be corrected by positioning a cylindrical lens having the same focal length as the CGH at close to the spherical lens (lens 58 in FIG. 7).

A CGH consisting of the parabolas described in Eq. 27 may be produced in accordance with the aforementioned article by Lee, by utilizing a digital plotter. For illustrative purposes, the following parameters were chosen as follows:

T = 2.5mm,
Q = 2,
$N_f = 80$,
w = 20cm
and L = 120cm.

Figure 6:
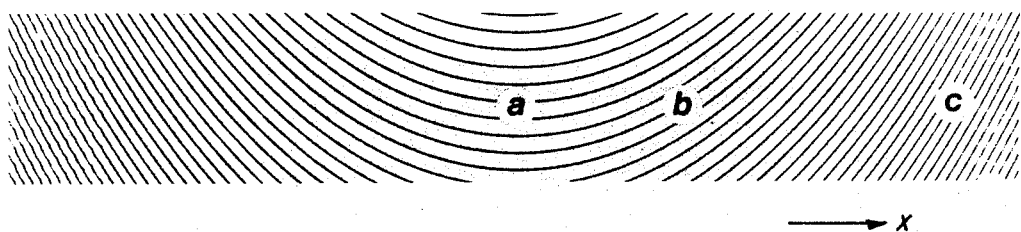
FIG. 6 is a simplified computer plot of a computer generated hologram utilized in the present invention.
Figure 8:
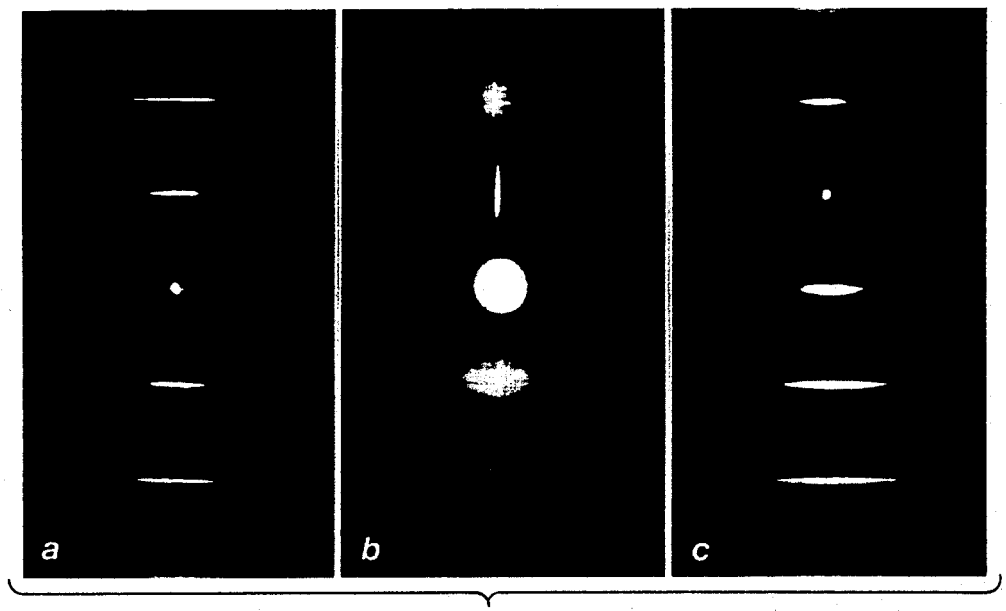
FIG. 8 is the diffraction patterns resulting from illuminating particular areas of the hologram shown in FIG. 6.

Note that L is not equal to Qw as in Eq. 23. The number of resolvable spots that can be addressed by this CGH is 320 (from Eq. 14). A simplified plot of such a CGH is shown in FIG. 6, showing the spatial frequency of the gratings varying linearly along the scan (x) direction. The actual CGH utilized as a scanner is reduced to 1/20 its original size on film and thereafter mounted on a rotating, transparent drum. The CGH may be reduced in size by using a photoreduction camera or the CGH may be plotted directly on film using a laser scanner.

Figure 7:
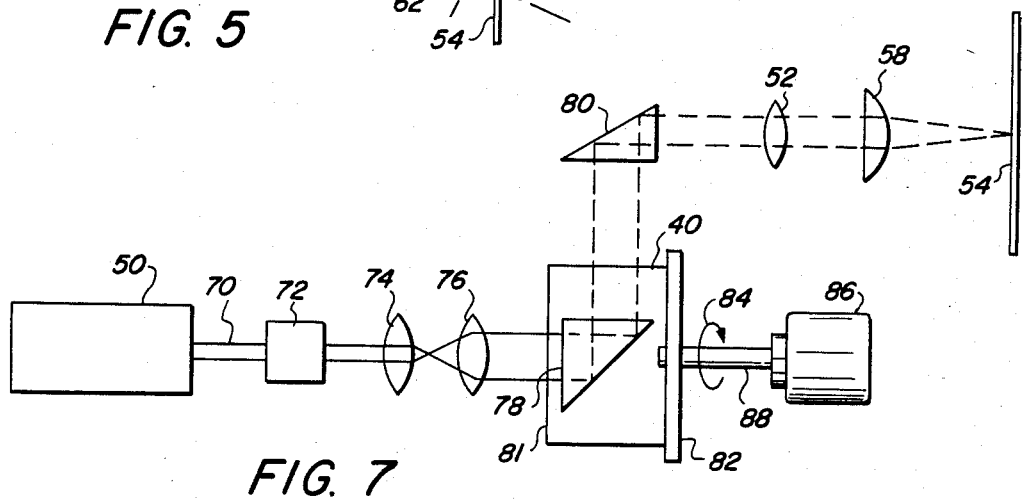
FIG. 7 is a third embodiment of the present invention.
Figure 9:
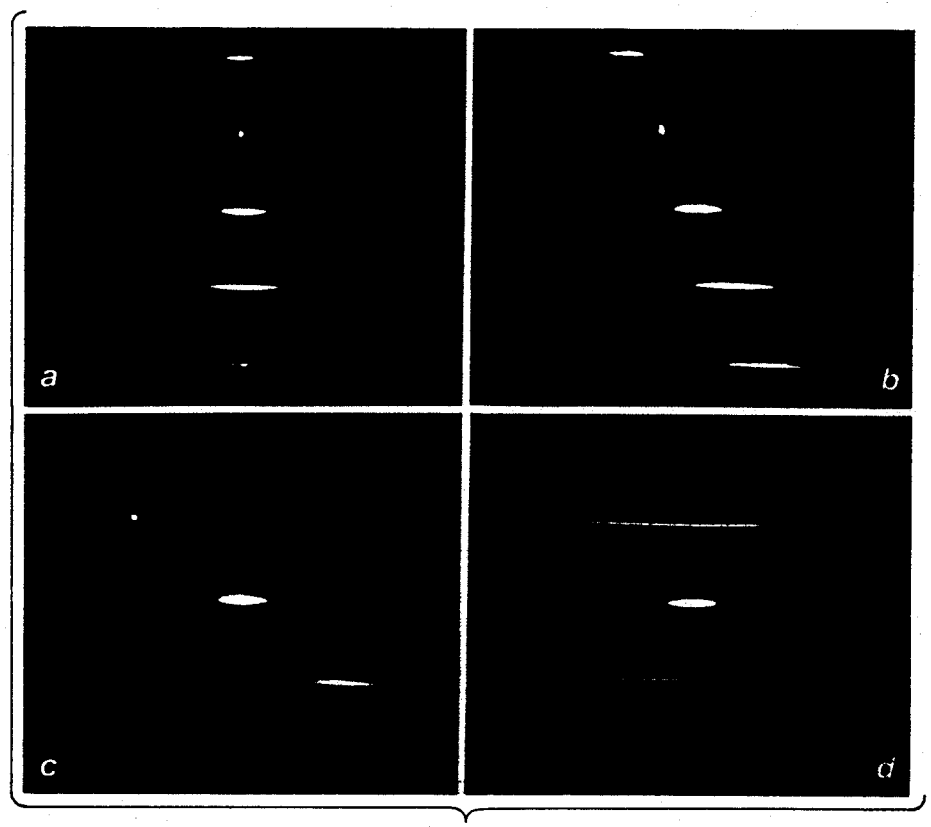
FIG. 9 shows the scanned laser spots as a function of the position of the hologram shown in FIG. 6.
Figure 10:
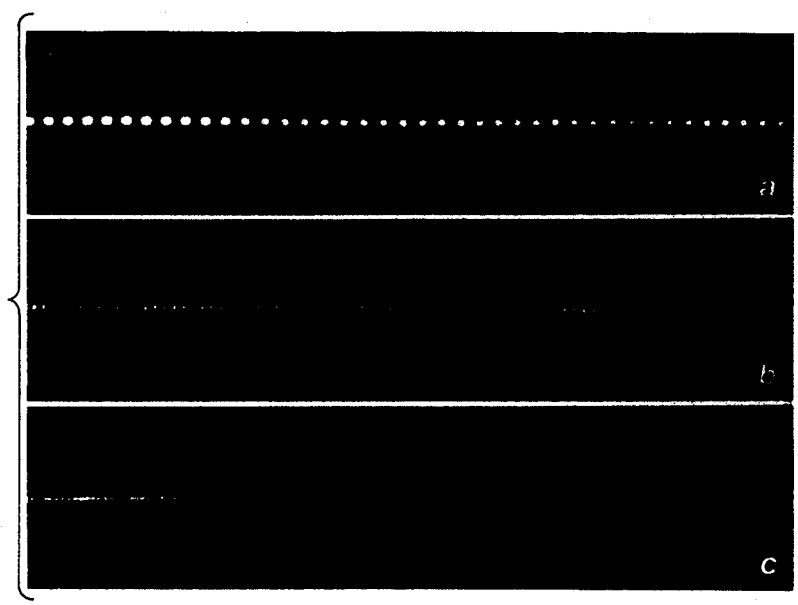
FIG. 10 shows the resolution of the laser scanner for a plurality of scan lines.

FIG. 7 illustrates an alternative system to that shown in FIG. 5. The laser beam 70 from laser 50 is modulated by modulator 72 in accordance with the information to be recorded at the photoreceptor located at frequency plane 54. The laser beam is expanded and collimated by lens 74 and 76, respectively. The light beam is directed through CGH 40 by means of prisms 78 and 80 and then focused by lens 52 and spherical lens 58 onto frequency plane 54. CGH 40 is mounted on the surface of transparent drum 81 affixed to support 82, prism 78 being mounted within transparent drum 81 as shown. Drum 81 is rotated in the direction of arrow 84 by motor 86 via drive shaft 88. When the area marked (a) in FIG. 6 is illuminated, the Fraunhofer diffraction pattern of CGH 40 isas shown in FIG. 8a. The spot in the center is caused by the undiffracted beam. The lines on either side of the center spot are from the diffracted waves of the CGH. The lengths of the lines are due to the quadratic phase variation of the CGH along x. One of the first-order diffracted waves from the CGH will come to focus at a small distance from the back focal plane of the lens L. Because the hologram is astigmatic, as explained earlier, this results in the lines shown in FIG. 8b. FIG. 8c shows the result of correction of the astigmatism in the CGH with a cylindrical lens. The dependence of the scanned spots on the position of the CGH is illustrated in FIG. 9. FIGS. 9(a)–(c) show the positions of the spots in the frequency plane when the areas marked (a)–(c) in FIG. 6 are illuminated, FIG. 9(d) showing the complete scan line when the drum upon which the CGH is mounted rotates. The length of the scan line is about four times the carrier frequency determined by the value of Q and Eq. 17. FIG. 10(a)–(c) shows the resolution of the laser scanner at 100 spots/scan, 200 spots/scan and 300 spots/scan, respectively.

The different spots/scan were obtained by adjusting the modulator 72 (FIG. 7). FIGS. 10(a) and (b) illustrate how the 100 and 200 spots, respectively, were well resolved. Although the spots shown in FIG. 10(c) are resolvable, 300 spots are close to the theoretical limit for the system.

Diffractive elements (i.e. the computer generated holograms described hereinabove) can be combined with conventional refractive and reflective elements whereby a simple lens will perform the bulk of the focusing and the CGH only the deflection and smaller focusing corrections.

Figure 11A:
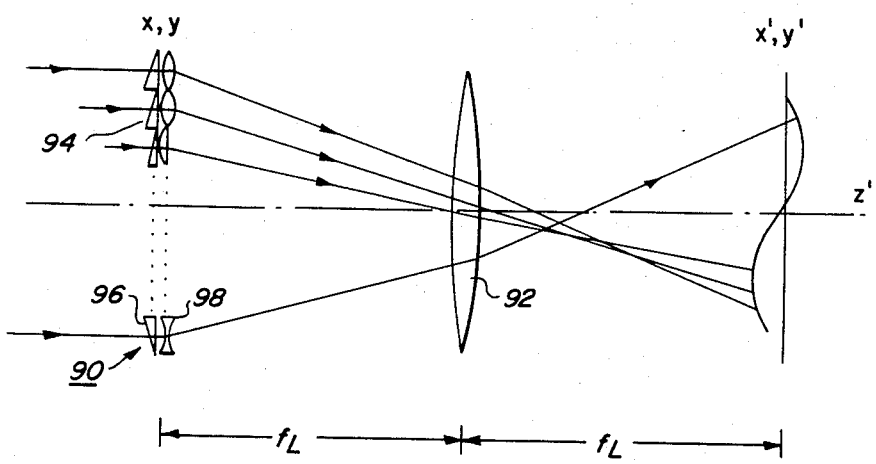
FIGS. 11A and 11B illustrates how the power spectrum of space-variant optical systems can be arbitrarily shaped and how the movement of the generalized diffractive element can be used in a scanning operation.

FIG. 11A illustrates how a computer-generated optical element 90, in combination with a lens 92, can transform a light wave to any desired pattern. Element 90, which can be any element that deviates light (such as variations in reflective index of the element, tilt of mirror surface; hologram), is placed in collimated monochromatic light 94 in the front focal plane of lens 92. The local phase variations of the element are represented in the figure as a combination of deflecting (prisms) and focusing (lenses) components 96 and 98, respectively. If the phase function introduced by the optical element 90 is $\phi(x,y)$, the normal to the wavefront leaving element 90 has the direction $$k^{-1}\delta\phi/\delta x, \ k^{-1}\delta\phi/\delta y, \quad (28)$$

and its radius of curvature is $$K^{-2}[k^2 + (\delta\phi/\delta x)^2]^{3/2}/ |\delta^2\phi/\delta x^2|, \quad (29)$$

$$k^{-2}[k^2 + (\delta\phi/\delta y)^2]^{3/2}/ |\delta^2\phi/\delta y^2|.$$

wherein $k = 2\pi/\lambda$ and the coordinates in the front focal plane of lens 92 (focal length $f_L$) are $x,y$ and in the back focal plane (the Fraunhofer diffraction plane F) $x', y'$. In the paraxial region $$x' = f_L/k \ \delta\phi(x,y)/\delta x, \ y' = f_L/k \ \delta\phi(x,y)/y \quad (30)$$

Furthermore, the light is focused a distance $$z' = -f_L^2/f_E(x,y) \quad (31)$$

from the frequency plane ($f_E(x,y)$ represents the focal length of the CGH). The map transformation system shown in FIG. 11A is described in more detail in copending application Ser. No. 544,526, filed Jan. 27, 1975 and assigned to the assignee of this application, the teachings of which are incorporated herein by reference.

Figure 11B:
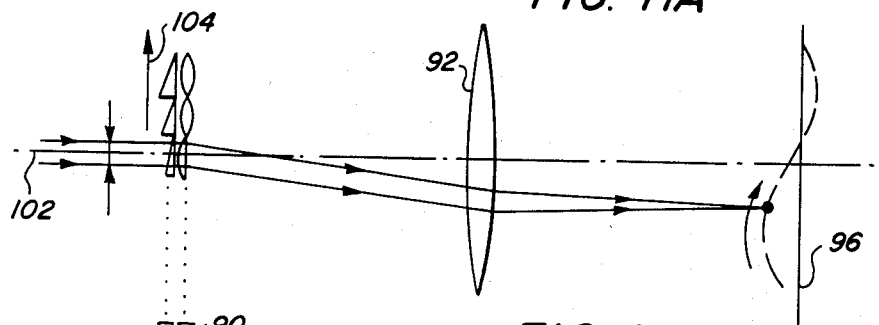

The scanning equivalent to the map transformation system of FIG. 11A is shown in FIG. 11B. A narrow light (laser) beam 102 enters along the optical axis of lens 92 and the optical element 90 is moved across beam 102 in the direction of arrow 104. Around the plane 96 the same pattern as in FIG. 11A will now be formed in the scanning mode.

The deflection $\theta$ achieved in the first diffraction order of the diffractive element with a spatial frequency $\nu$ is given by $$\sin\theta = \lambda\nu.$$

In these elements $\nu(x,y)$ is the decisive parameter. Variations in prismatic and lens effects over the component are introduced by proper local variation of the frequency of the grid structure, as set forth hereinabove and in the aforementioned copending application.

Figure 12A:
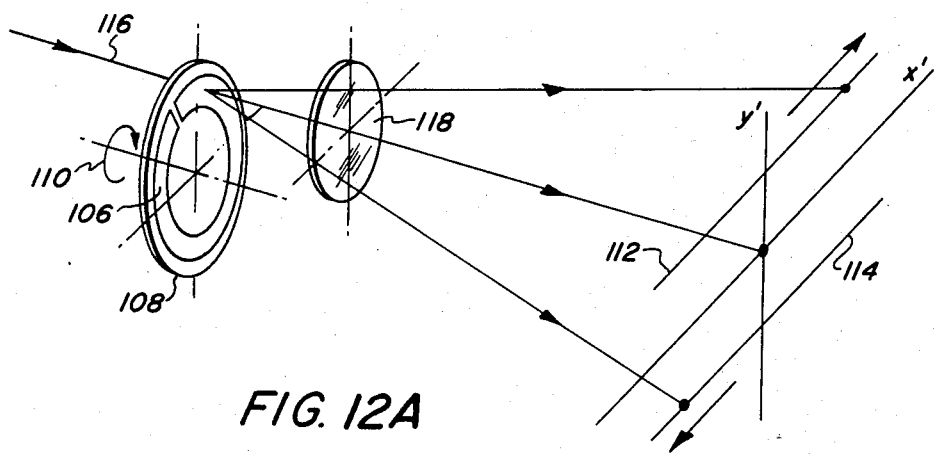
FIG. 12A is a scanner configuration where a line scan is achieved by rotating a disc shaped optical element.
Figure 12B:
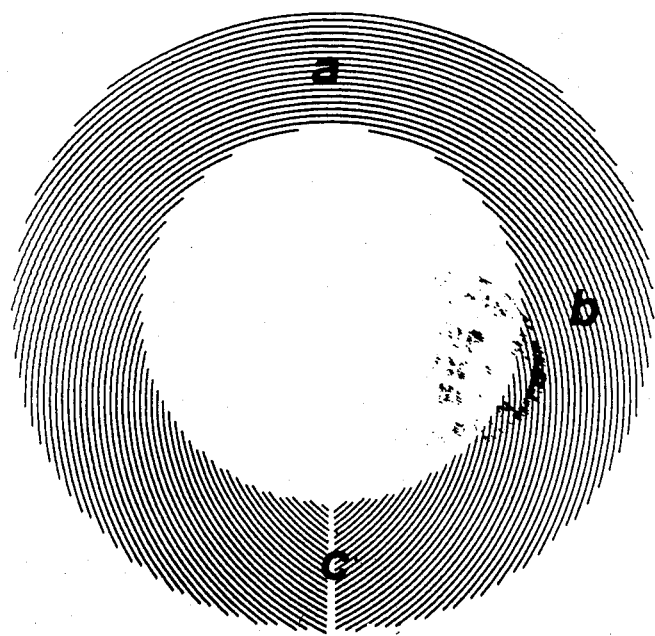
FIG. 12B shows the diffractive optical element of FIG. 12A in more detail.
Figure 12C:
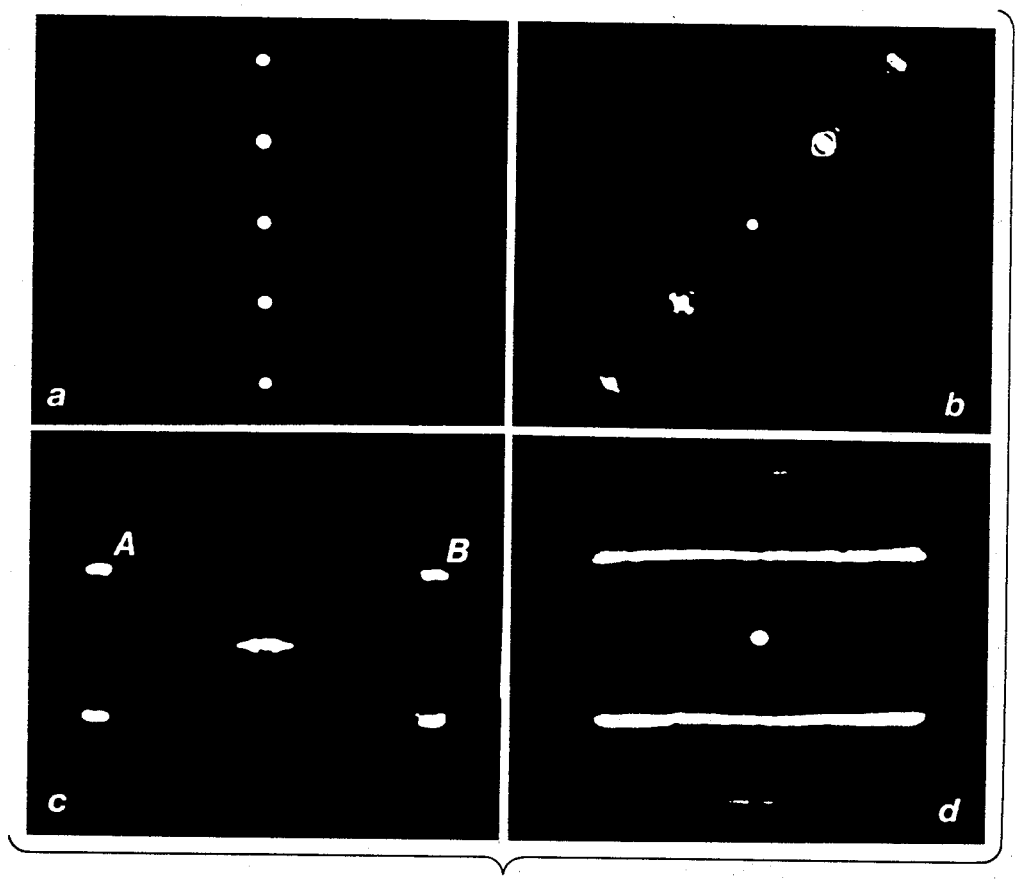
FIG. 12C shows a recording made with the disc scanner of FIG. 12A using the hologram of FIG. 12B.

A further scanner arrangement which may be utilized is illustrated in FIG. 12A. The diffractive (holographic) optical element 106 is shaped as an annular sector on a disc 108, the disc being rotated in the direction of arrow 110. The computer-generated hologram in the figure is a $2\pi$ sector, i.e. one scanline per revolution of disc 108 is formed. According to application and dimensional considerations, hologram 106 may occupy a $2\pi/n$ sector so that $n$ scans per revolution are possible. Due to the nature of diffractive elements several of them can be superposed on the same recording medium to create several independent scan patterns simultaneously (i.e. line scans 112 and 114 shown in the figure). By appropriately positioning a mask element, either line scan 112 or 114 is masked and the remaining line scan is utilized for scanning a surface. Laser beam 116 is diffracted by CGH 106, the diffracted beam being focused at the frequency plane by lens 1. FIG. 12B shows in more detail the optical element 106 (hologram) shown in FIG. 12A and FIG. 12C shows a recording made with the disk configuration of FIG. 12A using the hologram 106, recording portions (a) to (c) showing the scan spots corresponding to the illumination of the areas marked a, b, and c, respectively, on hologram 106.

FIG. 13(a) illustrates a computer generated hologram and FIG. 13(b) shows the corresponding scan pattern. Translation of the computer generated hologram across a laser beam, as described hereinabove, causes the diffracted beam to move in a spiral.

In the rotating, space-variant frequency gratings CGH's described hereinabove, the number of scanned spots is determined by $2\nu_o w$ where $\nu_o$ is the maximum spatial frequency of the grating along the scanned direction. If plotting of the CGH is done with a focused laser beam, a typical value for $\nu_o$ is 300 1/mm. Even with a beam width $w$ of 20mm, 12,000 spots can be obtained from the scanner. The number of spots can be increased further by using larger $w$. However, for the CGH similar to the off-axis spherical zone plate the length L must be longer than Qw. This means that the number of scanned spots is related to the scan rate. Alternately, if the CGH is an off-axis cylindrical zone plate, as discussed hereinabove, then L and w are not related. Hence, the scan rate is independent of $w$.

If the CGH is used to scan a laser beam having a wavelength in the visible region, the maximum deflection angle and the number of scanned spots are limited by the bandwidth of the plotting device used in producing the CGH. However, if the CGH is used to scan a beam from a $CO_2$ laser that has a wavelength of 10.6$\mu$m, the bandwidth requirement on the plotting device is reduced by at least 20 times.

In the multifaceted scanner mechanical scanner utilized in the prior art, the scan angle is related to the angle subtended by each of the facets to the axis of rotation. The scan rate in such a scanner can be increased by using more facets. However, the scan angle then becomes smaller. In the holographic scanner described herein, the scan angle depends only on the highest spatial frequency in the CGH. If many CGH's are recorded in sequence on the same piece of film, the scan rate of the scanner can be increased without changing the scan angle.

Because scanning of the light beam is done in the frequency plane of the CGH, the scanning is insensitive to motions or positions of the CGH in the direction normal to the scan direction. This property of the scanner can be applied to display color images. One possible method is to record three CGH's in parallel on the same film. Each CGH is designed for one of the three primary colors. When the CGH's are individually illuminated by red, green and blue laser beams, the focusing lens in FIG. 4 combines the three beams to form a single scan line to display images in color.

In the preferred embodiment, the CGH is first recorded on film and then wrapped around a drum for scanning. It can also be copied by interferometric techniques from its film record to another recording material that already has the geometry for scanning (e.g., a transparent drum or a disc). Copying the wavefront from the CGH onto a thick recording material can further increase the diffraction efficiency of a hologram for the scanner application.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or materials to the teachings of the invention without departing from its essential teachings.

What is claimed is:

1. A laser scanning system for scanning a coherent light beam across a surface comprising:
   means for generating a coherent light beam,
   an optical grating positioned such that an elemental portion of said optical grating is illuminated by said coherent light beam, and
   means for rotating said optical grating about an axis of rotation such that said light beam successively illuminates different elemental portions of said optical grating,
   said optical grating being computer generated and having a wavefront structure with fringes having a non-linear distance of separation in a direction radial to said axis of rotation and a non-linear distance separation in a direction tangential to the direction of rotation of said optical grating such that said light beam is scanned completely over a desired scan angle in a direction having at least a component tangential to said direction of rotation of said optical grating.

2. The laser scanning system of claim 1 wherein the fringes of said wavefront structure consist of a set of parabolas, the spacing of said parabolas being non-uniform.

3. The laser scanning system of claim 1 wherein said wavefront structure changes the focal point of said light beam as a function of the angle of scan of said light beam.

4. The laser scanning system of claim 1 wherein said wavefront structure changes the scan rate of said light beam as a function of the angle of scan of said light beam.

* * * * *